(12) United States Patent
Williams et al.

(10) Patent No.: US 10,766,638 B1
(45) Date of Patent: Sep. 8, 2020

(54) LANDING STROBE, SYSTEM AND METHOD FOR DEPLOYING THE LANDING STROBE

(71) Applicant: ELBIT SYSTEMS OF AMERICA, LLC, Fort Worth, TX (US)

(72) Inventors: John G. Williams, Nashua, NH (US); Richard P. Linnehan, Nashua, NH (US)

(73) Assignee: Elbit Systems of America, LLC, Fort Worth, TX (US)

( * ) Notice: Subject to any disclaimer, the term of this patent is extended or adjusted under 35 U.S.C. 154(b) by 0 days.

(21) Appl. No.: 16/371,697

(22) Filed: Apr. 1, 2019

(51) Int. Cl.
*B64F 1/20* (2006.01)
*G08G 5/00* (2006.01)

(52) U.S. Cl.
CPC ............. *B64F 1/20* (2013.01); *G08G 5/0047* (2013.01)

(58) Field of Classification Search
CPC ............................... B64C 39/024; G01S 19/14
See application file for complete search history.

(56) References Cited

U.S. PATENT DOCUMENTS

| | | | |
|---|---|---|---|
| 9,007,236 B2 | 4/2015 | Lewis | |
| 2005/0231381 A1* | 10/2005 | Pederson | B60Q 1/2611 340/815.45 |
| 2010/0039801 A1* | 2/2010 | Pelletier | F21L 2/00 362/184 |
| 2013/0126680 A1* | 5/2013 | Hamke | B64C 39/024 244/23 A |
| 2013/0182449 A1 | 7/2013 | Fidanza | |
| 2014/0049953 A1* | 2/2014 | Moore | F16M 11/16 362/220 |
| 2015/0036336 A1 | 2/2015 | Yang et al. | |
| 2015/0263806 A1 | 9/2015 | Puscasu et al. | |
| 2017/0305537 A1* | 10/2017 | Smith | G05D 1/0094 |
| 2017/0359515 A1 | 12/2017 | Harris et al. | |
| 2018/0312274 A1* | 11/2018 | Kessler | B64D 47/02 |
| 2019/0087635 A1 | 3/2019 | Klaus | |
| 2019/0109973 A1 | 4/2019 | Riza | |

OTHER PUBLICATIONS

Office Action for corresponding U.S. Appl. No. 16/371,751; action dated Feb. 21, 2020; (12 pages).
Office Action for corresponding U.S. Appl. No. 16/371,840; action dated Mar. 5, 2020; (14 pages).

* cited by examiner

*Primary Examiner* — Fabricio R Murillo Garcia
(74) *Attorney, Agent, or Firm* — K&L Gates LLP

(57) ABSTRACT

A landing strobe is provided that comprises a vane extending from the landing strobe, and an actuator coupled to the vane. The actuator can be configured to move the vane from a first position to a second position upon impact of the landing strobe. The landing strobe can also comprise an optical emitter configured to emit an adjustable radiation pattern extending radially around a central axis that is substantially vertical when the van is moved to the second position. A landing strobe system is also provided and comprises a landing strobe configured to be released from an aircraft arranged over a landing zone. The vane is configured to extend at an upward angle outward from the landing strobe when released from the aircraft. The vane is further configured to extend at a downward angle outward from the landing strobe when the landing strobe contacts the landing zone.

20 Claims, 9 Drawing Sheets

ലANDING STROBE, SYSTEM AND METHOD FOR DEPLOYING THE LANDING STROBE

BACKGROUND

A landing craft may need to land at a site for a pick up or drop off operation. The site can be on ground or on water, and is henceforth referred to as a landing zone. The landing craft, or aircraft, is generally above the landing zone in need of identifying a proper site for landing during pick up or drop off.

The aircraft includes personnel or guidance equipment used to detect and land at or near the landing zone. The aircraft includes either a fixed-wing or rotary-wing aircraft. If the landing zone is visually degraded, possibly due to cloud cover, fog, or dust and sediment stirred by the aircraft, it may be difficult for the equipment or personnel within the overhead aircraft to visually detect the landing zone. The landing zone may therefore include one or more beacons, or strobes, placed at or near the landing zone. The landing strobe or strobes can be configured to emit visible or invisible light that is detectable by the overhead aircraft, henceforth referred to as an aircraft albeit understood to encompass a watercraft provided there is proper landing gear underwater or floatation upon the water. A landing strobe placed at or near the landing zone can therefore help guide the aircraft toward, for example, a friendly landing zone.

SUMMARY

In accordance with at least one example of the disclosure, a landing strobe comprises a vane extending from the landing strobe and an actuator coupled to the vane. The actuator can be configured to move the vane from a first position to a second position upon impact of the landing strobe. The landing strobe can also comprise an optical emitter configured to emit an adjustable radiation pattern extending radially around a central axis that is substantially vertical when the van is moved to the second position.

In accordance with at least one other example of the disclosure, a landing strobe system comprises a landing strobe configured to be released from an aircraft arranged over a landing zone. The landing strobe system can also comprise a vane configured to extend at an upward angle outward from the landing strobe when released from the aircraft. The vane is further configured to extend at a downward angle outward from the landing strobe when the landing strobe contacts the landing zone.

In accordance with at least one other example of the disclosure, a method for designating a landing zone for an aircraft comprises releasing a landing strobe from an aircraft. During descent of the landing strobe from the aircraft, at least three vanes can extend outward from the strobe in upward angles away from a descent direction. After descent has ended, the at least three vanes can be moved in dissimilar downward angles upon the landing zone.

BRIEF DESCRIPTION OF THE DRAWINGS

For a detailed description of various examples, reference will now be made to the accompanying drawings in which.

DETAILED DESCRIPTION

This description is generally directed to vision enhancement through turbid media, such as fog, cloud cover, dust or sediment that occupy an overhead vehicle, or operator of that vehicle, field of view. The overhead vehicle comprises any vehicle that can land on ground or water. Ground can be the floor of a body of water. Henceforth, the overhead vehicle is referred alternatively as an aircraft, even though the term "aircraft" hereinafter interchangeably refers to watercraft. The disclosed description includes devices, systems, and methods to enhance the ability to perceive light emission from sources upon or within a landing strobe. The light sources include an optical emitter that can emit light either in the visible or invisible wavelength ranges. The optical signal emitted from the optical emitter can be in the infrared wavelength range, such as short wave infrared (SWIR), medium wave infrared (MWIR), or long wave infrared (LWIR). The optical emitter can include xenon, halogen, flash, incandescent, light emitting diode (LED), or any other visible or invisible optical signal source. The optical emitter can include a filter or lens to select the upward radiation pattern, or can direct the radiation in an omni-directional pattern.

This description is also directed to a light detection system, and a method for detecting the optical signals emitted from the optical emitters upon or within one or more landing strobes. The detector system can be employed on the overhead aircraft to detect that which is undetectable by the human eye, and accordingly, can include an enhanced contrast-based, image processing system using, for example, forward looking infrared (FLIR) technology. In one example, the detector system can include a pixelated sensor, an optical bandpass filter or set of filters, an imaging lens, and a processor. The detector system can further include a memory coupled to the processor to store the pixelated data as well as other information corresponding to the optical signal or signals sent from the landing strobe or strobes. The detectors system can be mounted on or within the aircraft, on a standalone device within the aircraft, or on the goggles or headpiece of one or more personnel within the aircraft.

Figure 1:
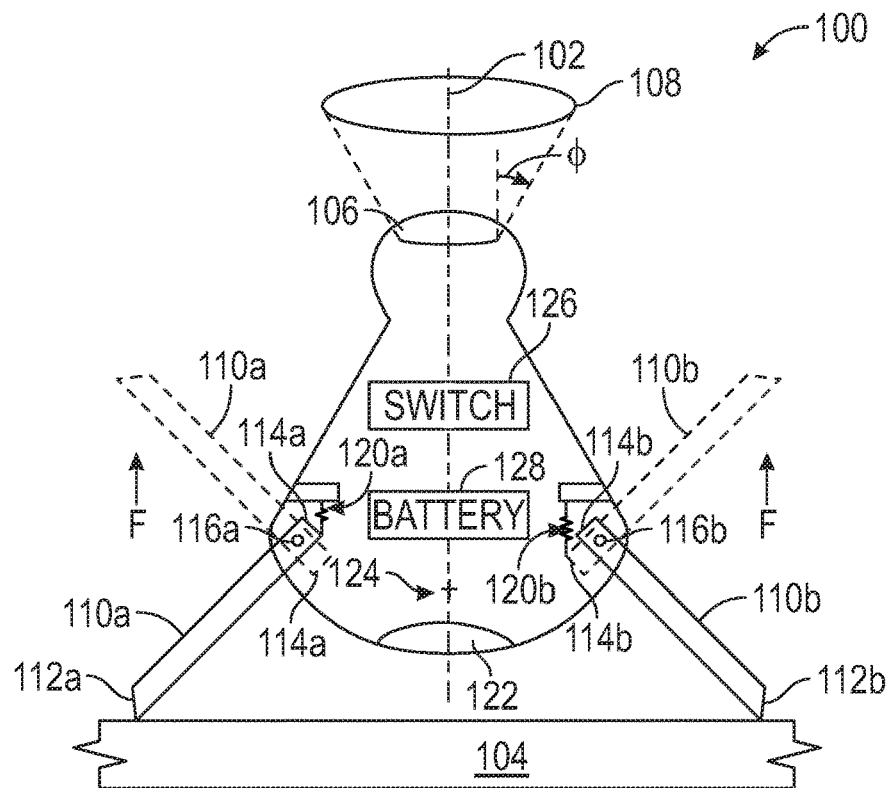
FIG. 1 shows a side partial cross-sectional and plan view of a landing strobe configured with moveable vanes in accordance with various examples.

Referring to the drawings, FIG. 1 shows a landing strobe 100, according to one example. Landing strobe 100 can be deployed from an overhead aircraft or by personnel on the ground. Whether deployed from a spaced distance above the ground, such as from an aircraft, or deployed on the ground, once landing strobe 100 is deployed, a central axis 102 is configured to extend substantially vertical (i.e., substantially perpendicular to a surface of ground 104).

Central axis 102 extends preferably through the center of landing strobe 100. Included with landing strobe 100 is an optical emitter 106. Optical emitter 106 can emit a radiation pattern 108 that extends at adjustable radial angles and distances from central axis 102. The radiation pattern 108 from optical emitter 106 can comprise coherent or non-coherent light, with the outer extents of pattern 108 adjustable by angle Φ around central axis 102.

Landing strobe 100 further includes at least one vane 110 (depending upon the number of vanes, 110a, 110b, etc.) extending radially outward and at angle from central axis 102. Each vane 110 has a distal end 112 (depending on the number of vanes, 112a, 112b, etc.) that extends furthest from the landing strobe 100. Each vane 110 also has a proximal end 114 (114a, 114b, etc.) that can be inside of the outer housing of landing strobe 100.

Each vane includes a blade that has a relatively flat surface which extends from the proximal end 114 to the distal end 112. Each blade can rotate around the central axis 102 during descent from an overhead aircraft to ground 104, or each blade can pivot around pins 116 (116a, 116b, etc.) arranged near the proximal end 114 and preferably within the housing of landing strobe 100. If, for example, landing strobe 100 is dropped from an overhead aircraft, the force F of air upon the elongated blade of each vane 110 will push each vane 110 to a first position shown in phantom line. The amount of force F caused by the air resistance upon each vane 110 during descent of landing strobe 100 will overcome a biasing force of a biasing mechanism 120 (120a, 120b, etc.) applied to the proximal end 114. Biasing mechanism 120 is any mechanism that would draw the corresponding distal end 112 toward ground 104. However, if the air resistance force F exceeds the downward force of biasing mechanism 120, then the vanes 110 will be configured with distal ends 112 facing upward and away from ground 104. For example, the biasing mechanism 120 can be a spring. As shown in FIG. 1, biasing mechanism 120b is shown with the spring expanded when the corresponding vane 110b is facing upward. However, the spring of biasing mechanism 120a is shown compressed after descent is completed and there is no longer upward air resistance force F, thereby compressing the spring of biasing member 120a.

Regardless of the configuration of the biasing member 120, whether a spring or not, biasing mechanism 120 is preferably configured inside landing strobe 100 to draw the corresponding vane 110 downward against the upward air resistance force F. When descent has ended and air resistance no longer is applied, the biasing mechanism 120 will force the vanes 110 and corresponding distal ends 112 to a second position against the surface of land 104.

Landing strobe 100 still further includes a weighted base 122 centered radially about the central axis 102, below a center of gravity 124 and also below the pivot pins 116. The amount of weight within the weighted base 122 can vary depending on the overall weight of landing strobe 100, provided the amount of weight is sufficient to maintain the center of gravity 124 below the pivot pins 116, and to also maintain the central axis 102 in a vertical position substantially collinear with a descent vector and substantially perpendicular to the underlying surface of ground 104. Included within landing strobe 100 is a switch preferably mounted on the housing of landing strobe 100 that, when actuated, turns on emitter 106. The switch can be actuated either manually by a user before launching strobe 100, or by a user on the ground after the strobe is launched. The switch can also be activated remotely by aircraft personnel or remotely by a user on the ground after the landing strobe 100 is launched. It may be desirable to activate the optical emitter 106 after the landing strobe 100 is placed on the ground so as to disguise illumination from unauthorized personnel during descent. A battery 128 can also be included within landing strobe 100 to supply power to the components within landing strobe 100, including optical emitter 106. Battery 128 includes any device that can store electrical energy and can be charged or recharged either prior to deployment or after deployment when the landing strobe 100 is on ground 104.

Figure 2:
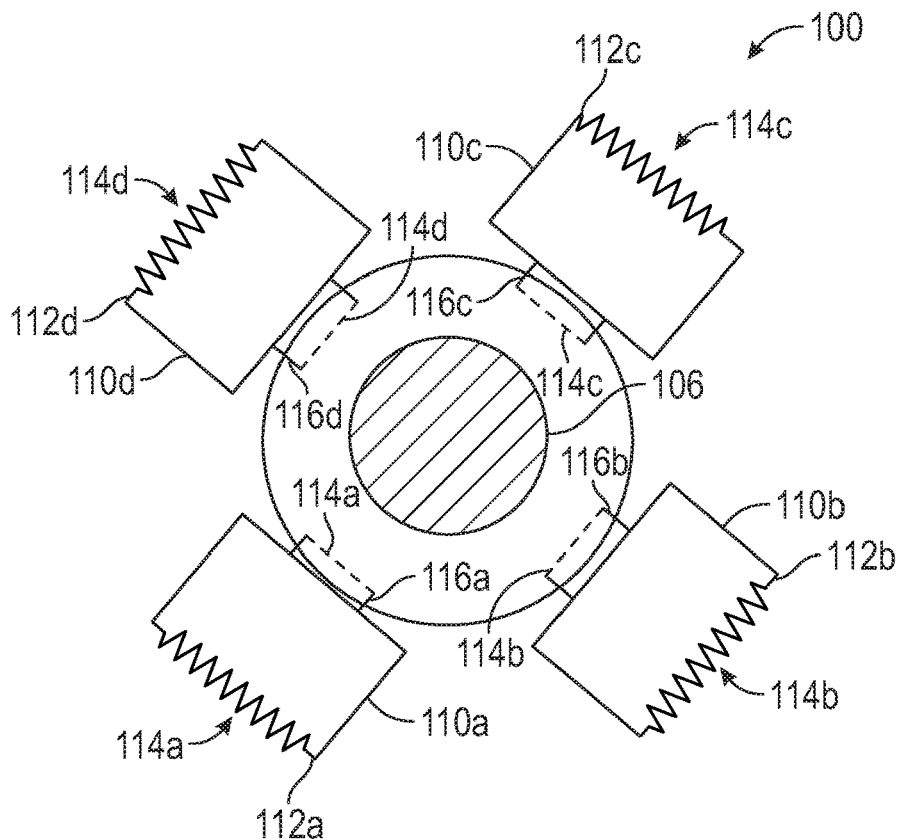
FIG. 2 shows a top view of the vanes extending outward from the landing strobe in accordance with various examples.

FIG. 2 shows a top view of landing strobe 100 according to another example. Landing strobe 100 includes optical emitter 106, and at least three but preferably four vanes 110 (e.g., 110a, 110b, 110c, and 110d). The proximal end 114 of each vane 110, shown as 114a, 114b, 114c, and 114d, are inside the outer housing of landing strobe 100, pivotal about the corresponding pins 116 (e.g., 116a, 116b, 116c, and 116d). The distal ends 112 (e.g., 112a, 112b, 112c, and 112d) can include a spaced set of protrusions 114 (e.g., 114a, 114b, 114c, and 114d) that can extend outward and possibly downward into a point or apex. When descent has ended and the distal ends 112 extend downward, the series of protrusions 114, and specifically the tips of each protrusion 114 pierce into the ground 104 (FIG. 1) caused by the downward force of the biasing mechanism 120 (FIG. 1). The combination of the protrusions 114 and the downward biasing force of biasing mechanism 120, frictionally engage the ground 104 to keep the landing strobe 100 in the proper position with central axis 102 substantially perpendicular to the upper surface of ground 104.

Figure 3:
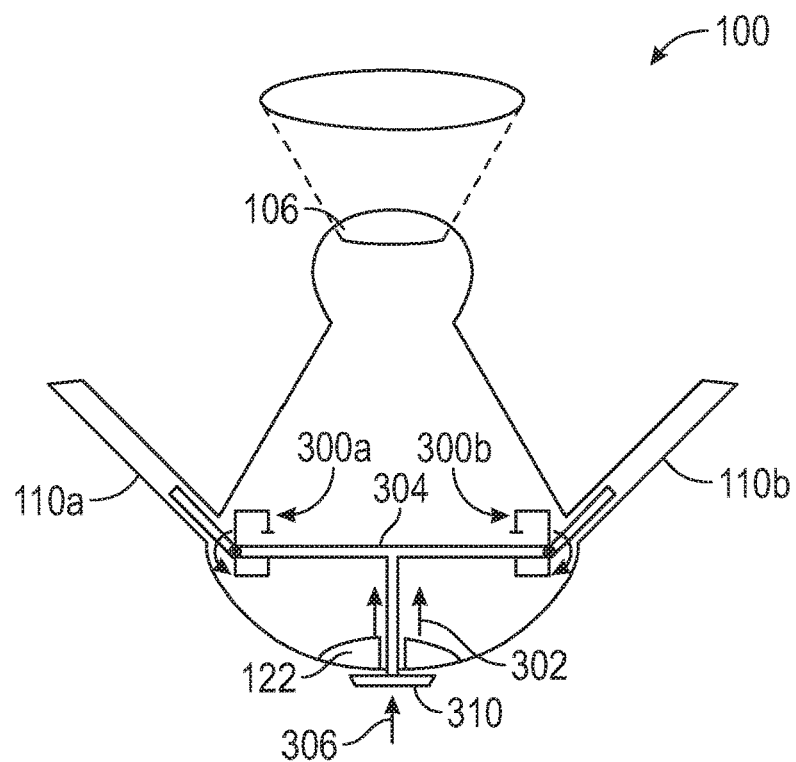
FIG. 3 shows a side partial cross-sectional and plan view of the landing strobe configured with vanes that are mechanically moveable in accordance with various examples.

FIG. 3 illustrates landing strobe 100 according to another example. Specifically, in addition to the biasing member 120 of FIG. 1, or in lieu of the biasing member 120, landing strobe 100 can include an actuator 300 corresponding to each vane (e.g., 300a and 300b) and coupled to the proximal ends of respective vanes 110 (e.g., 110a and 110b). Actuator 300 operates similar to the biasing mechanism 120 as a component of landing strobe 100 responsible for moving the corresponding vane 100. Actuator 300 can be a component coupled to receive an actuation signal. In the example of FIG. 3, the actuation signal can be a mechanical signal of, for example, mechanical force 302 applied to an arm 304 that releases a latch within each actuator 300 (e.g., actuator 300a and 300b). Release of the latch will cause movement of each vane 110 from an upward angle first position to a downward angle second position when the actuation signal 302 impact force 306 is applied to transducer 310. Accordingly, transducer 310 is a mechanical transducer that sends an actuation signal 302 to corresponding actuators 300 to move corresponding vanes 110 to a downward second position, where the distal ends of each vane can contact the ground.

Figure 4:
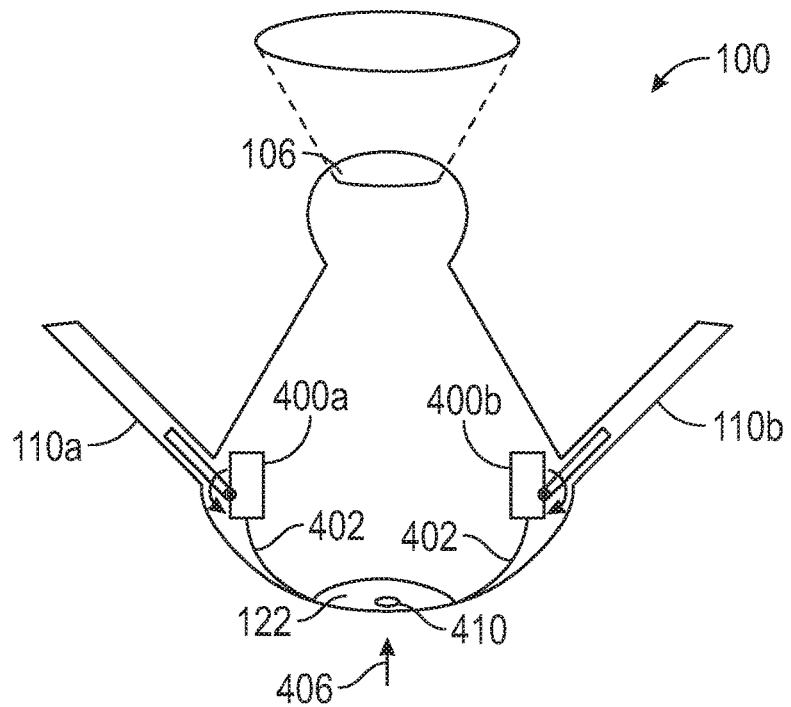
FIG. 4 shows a side partial cross-sectional and plan view of the landing strobe configured with vanes that are electrically moveable in accordance with various examples.

FIG. 4 illustrates landing strobe 100 according to yet another example. Landing strobe 100 of FIG. 4 can include an electrical transducer 410 that, upon receiving impact force 406, transducer 410 sends an actuation signal 402 across, for example, a wire to actuators 400 (e.g., 400a and 400b). Upon receiving the actuation signal 402 when landing strobe 100 impacts ground, actuator 400 moves the corresponding vane 110 (e.g., 110a and 110b) downward so that the distal ends of each vane 110 contact ground. The actuators 300 (FIG. 3) and 400 (FIG. 4) serve to level the strobe 100 so that the central axis 102 points upward in a substantially vertical direction. The directionality is described in reference to FIG. 6. Regardless of whether the vanes are moveable by a biasing mechanism or an electrical or mechanical transducer coupled to an electrical or mechanical actuator, each landing strobe 100 includes a weight 122 near its base, and a optical emitter 106 mounted substantially opposite of the base. The optical emitter 106 can include one or more emitters possibly arranged in an array.

Figure 5:
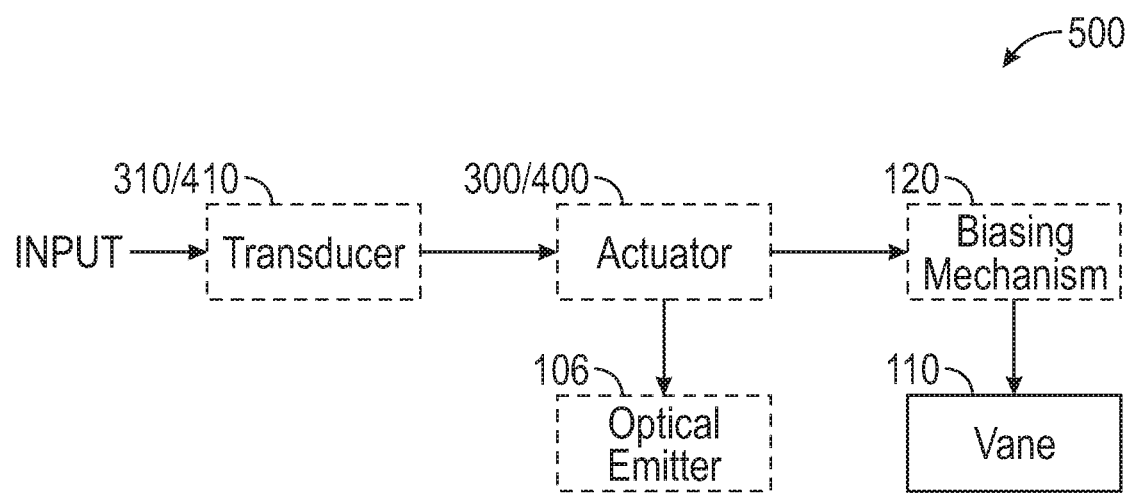
FIG. 5 shows a block diagram of a system for moving the vane or vanes in accordance with various examples.

FIG. 5 shows a block diagram of a landing strobe system 500 for moving the vanes 110 (FIGS. 1-4) in accordance with various examples. When receiving an input, such as upward force on the landing strobe 100 during impact, a mechanical or electrical transducer 310/410 can send an actuation signal to the corresponding mechanical or electrical actuator 300/400 (FIGS. 3 and 4). However, if the actuator is a biasing mechanism 120 (FIG. 1), then the biasing mechanism 120 will move the corresponding vane 110 downward rather than the mechanical or electrical actuator 300/400. Depending upon which mode of operation is used, the transducer 310/410 as well as actuator 300/400 can be eliminated in favor of simply a biasing mechanism 120. Alternatively, the biasing mechanism 120 can be eliminated in favor of a transducer 310/410 and an actuator 300/400. Additionally, the actuator 300/400 can operate similar to biasing member 120, or actuator 300/400 can also include a separate biasing member 120 to maintain the electrically or mechanically actuated vanes 110 in their downward biased positions after having been actuated. The actuator 300/400, whether operating separate from or as part of biasing mechanism 120, can actuate the optical emitter 106 when the landing strobe 100 impacts ground. Therefore, instead of the switch 126 (FIG. 1) activating the optical emitter 106 either locally or distally from landing strobe 110, the actuator 300/400 can automatically turn on or actuate the optical emitter 106 during impact.

Figure 6:
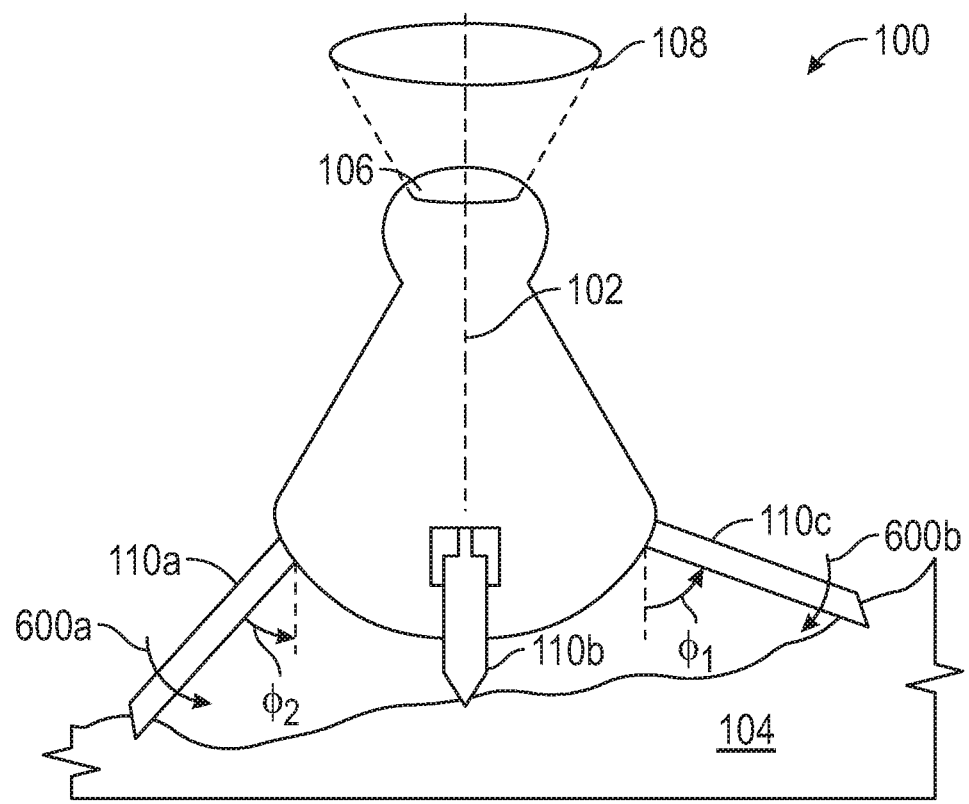
FIG. 6 shows a side view of the landing strobe deployed at a landing zone in accordance with various examples.

FIG. 6 shows a side view of landing strobe 100 after decent has ended, or after landing strobe 100 is placed by personnel on ground 104. At least three vanes 110 (e.g., 110a, 110b, and 110c) are shown moved to a second position upon impact or by personnel on ground 104. Either the biasing mechanism 120 and/or the actuator 300/400 (FIG. 5) moves the vanes 110 to the second position, but at dissimilar angles $\Phi_1$ and $\Phi_2$. Thus, the downward force 600a may be the same as or greater than the downward force 600b, causing the difference in angular orientation of corresponding vane 100a and 110c. The difference in angular orientation and specifically the downward angle orientation of each vane is biased downward by different forces on corresponding vanes to ensure that the central axis 102 remains substantially vertical and also substantially perpendicular to ground 104, even though the upper surface of ground 104 can have an uneven topology.

The vertical orientation of central axis 102 is beneficial if the radiation pattern 108 of optical emitter 106 is to extend in a conical fashion substantially upward. Arranging the radiation pattern 108 substantially upward, after impact or when the ground personnel activates the optical emitter 106, minimizes unwanted personnel or instrumentation at or near ground level from optically detecting the upwardly directed optical signal. It is desirable that only friendly personnel be allowed to see the landing strobe output, those personnel being above the landing strobe, possibly within an aircraft and possibly having appropriately tuned optical detection systems.

Figure 7:
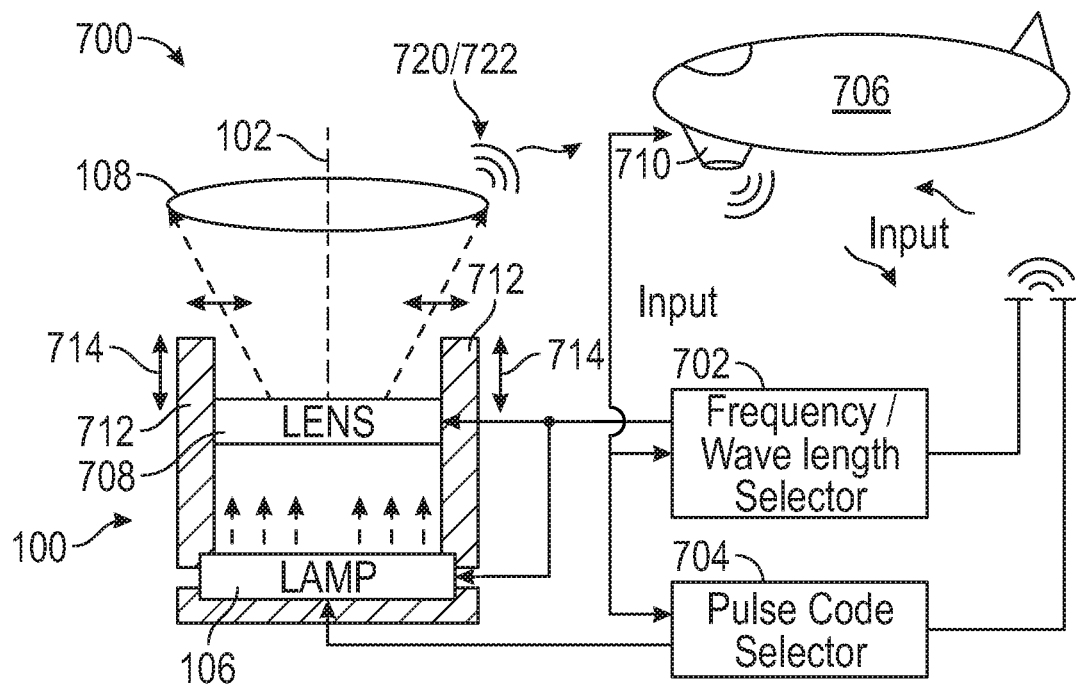
FIG. 7 shows a block diagram of a system for assigning (preferably through user-actuated switches) an optical signature strobe output to one or more landing strobes, and for assigning an optical radiation pattern from the landing strobes in accordance with various examples.

FIG. 7 shows a block diagram and partial cross-sectional view of a system for assigning an optical signature strobe output to one or more landing strobes. The signature strobe output preferably different for each landing strobe 100 so that each landing strobe 100 has an optical signal output from its optical emitter 106 that is unique to that landing strobe. There may be applications, however, when a group of landing strobes 100 corresponding to a single landing zone may each have the same signature strobe output. Therefore, the optical signal of each landing strobe 100 of a corresponding landing zone will have the same optical signal output to uniquely identify that landing zone from possibly other landing zones nearby.

FIG. 7 illustrates a system 700 for assigning a signature strobe output from a landing strobe 100 unique to that landing strobe, or assigning a signature strobe output unique to a group of landing strobes 100 within or near a landing zone unique to that landing zone. The signature strobe output is assigned as a frequency or a frequency range unique to the landing strobe 100 or group of landing strobes 100, a wavelength or range of wavelengths unique to landing strobe 100 or group of landing strobes 100, or a repetitive and periodic series of pulses unique to landing strobe 100 or a group of landing strobes 100. For example, as a landing strobe 100 produces a series of optical signals at periodic intervals, each optical signal can be set to a unique optical signal frequency, a unique optical signal wavelength, and/or a unique series of coded pulses. The unique frequency and/or wavelength is set via a frequency/wavelength selector 702. The unique repetitive and periodic series of coded pulses are set by a pulse code selector 704. For example, a landing strobe 100 or group of landing strobes 100 associated with a landing zone can be set to output an optical signal of a signature strobe output to a repetitive and periodic series of coded pulses that are two long pulses, followed by a short pulse, followed by one long pulse unique to that landing strobe 100 or group of landing strobes 100, rather than a repetitive and periodic series of four short pulses followed by a long pulse. The signature strobe output set within the frequency/wavelength selector 702 and/or the pulse code selector 704 occurs via a user input. Selectors 702 and 704 can thereby be considered as an input device selector having a port configured to receive an input (INPUT) for setting the signature strobe output. The port can either be a wired port, such as a switch that is configured on and coupled to the landing strobe 100, and is user-actuated and configured to receive the input from a user. The port can be wired and can receive the input from a device held by a user and physically coupled to the wired port. It is preferred that the port is a wired port, and more specifically a switch that is actuated by a user to select the signature strobe to be output from the landing strobe or strobes 100. Alternatively, however, the port can be a wireless port configured to receive the input from a device in remote wireless communication with the wireless port, provided the wireless link or channel does not transmit in interference with other aircraft communication systems, such as navigation and communication to and from base. The device can be any device in which a user can access the wired or wireless port. The device, if accessing the port wirelessly, can be in an aircraft 706 spaced from the input port and specifically, the input devices or selector 702 and 704.

The input devices or selectors 702 and 704 receive an input via the corresponding port and configure, or set, the optical emitter 106 output to the appropriate frequency, frequency range, wavelength, wavelength range, and/or pulse code. The signature strobe output can be set or configured within a storage device communicatively coupled to optical emitter 106. If the signature strobe output is a frequency, frequency range, wavelength, wavelength range, then the signature strobe output can be set within a modifiable optical filter communicatively coupled to lens 708.

Once configured or set within the input device of selectors 702 and 704 so that the appropriate and unique signature strobe output is emitted from the optical emitter 106 as an optical signal having a radiation pattern 108, aircraft 706 is configured to detect the signature strobe output that is unique to landing strobe 100 or group of landing strobes 100 of a landing zone. Aircraft 706 therefore includes a detector 710 that can detect the signature strobe output unique to a landing strobe 100 or a group of landing strobes 100, and therefore discern one landing strobe 100 from another and/or one landing zone from another landing zone.

FIG. 7 further illustrates system 700 for adjusting the radiation pattern 108 at different angles relative to central axis 102. The adjustable radiation pattern 108 can be modified by moving, for example, a reflective cylindrical housing 712 at different distances 714 above optical emitter 106 and/or lens 708. The further the cylindrical housing 712 extends above the optical emitter 106, the lessened amount of radiation pattern 108 extends at an angle relative to central axis 102. If housing 712 is moved downward so that the upper extents of housing 712 are drawn toward optical emitter 106, the greater the outer extent of radiation pattern 108, and the greater is the outer extents angle of the optical signal relative to central axis 102. Lens 106 is preferably fixed within the cylinder of housing 712, with the upper extents of housing 712 moveable relative to the lens 106, or vice versa. Thus, the optical signal 720 and, if uniquely set, signature strobe output 722 can be configured in various ways to radiate upward toward aircraft 706 and, specifically, detector 710 at different radiation patterns and, specifically different radiation patterns having different outer extents or angles relative to central axis 102.

Figure 8:
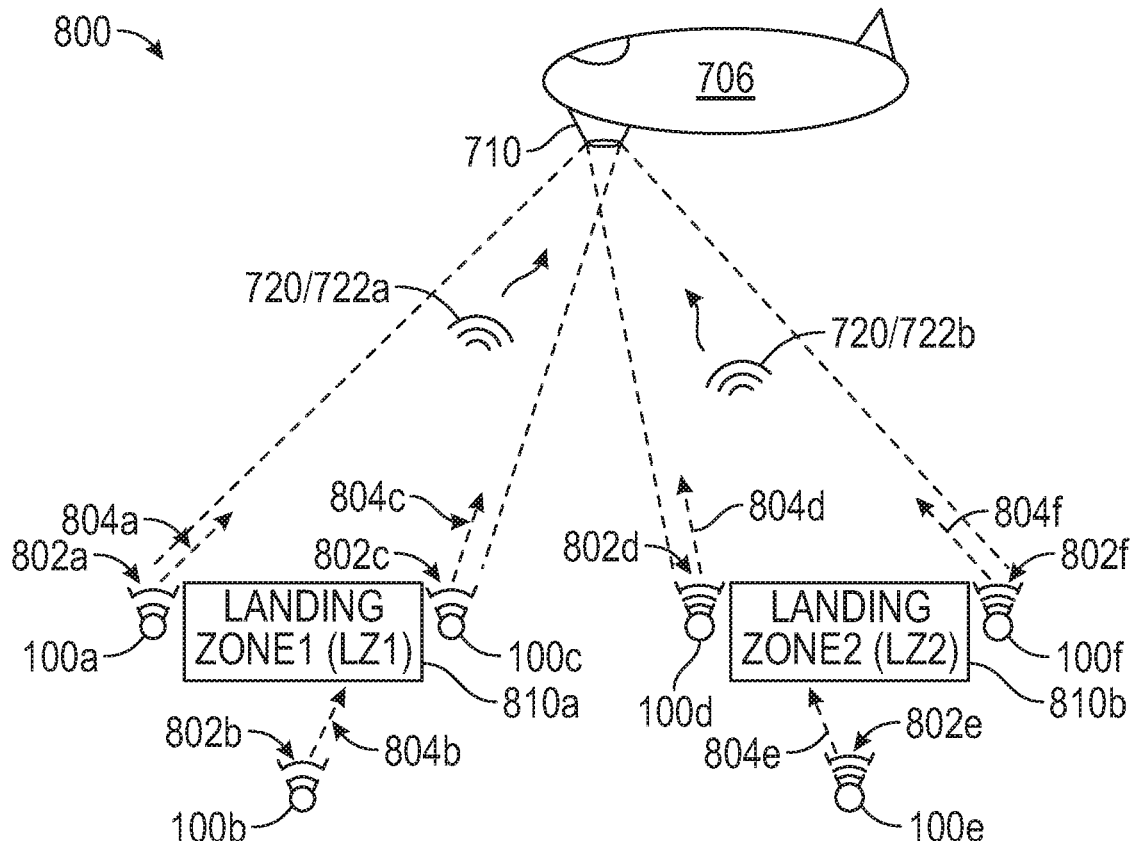
FIG. 8 shows a schematic diagram of a system for assigning a unique signature strobe output and radiation pattern from one or more landing strobes surrounding a landing zone in accordance with various examples.

FIG. 8 shows a schematic diagram of a system 800 for assigning a unique optical signature and pattern from one or more landing strobes 100 (e.g., 100a, 100b, 100c and 100d) of two or more landing zones LZs 810 (e.g., LZ1 810a and LZ2 810b). For example, the landing zone 810a as well as landing zone 810b each emits an optical signal 720 from corresponding landing strobes 100a-c and 100d-f to detector 710 of aircraft 706. However, landing strobes 100a-c can be configured with a signature strobe output 722a that is different from the signature strobe outputs 722b from landing strobes 100d-f of landing zone 810b. Due to that difference, where signature strobe output 722a is unique to LZ1 810a, and signature strobe output 722b is unique to LZ2 810b, personnel within aircraft 706 can utilize detector 710 to determine which landing zone (LZ1 versus LZ2) aircraft 706 is to land. For example, the frequency or wavelength 802a-c of the optical signal 720 of LZ1 810a can be the same (unique to LZ1 810a) but different from the frequency or wavelength 802d-f of the optical signal 720 from LZ2 810b. Thus, the frequency/wavelength of the optical signal of signature strobe 722a can be different from that of signature strobe 722b which, when detected by detector 710, allows the landing zone designation system 800 to determine which landing zone aircraft 706 is to land. In lieu of a unique frequency/wavelength of one signature strobe output 722a relative to the other signature strobe output 722b, coded pulses 804a-c output from landing strobes 100a-c can be different from coded pulses 804d-f from landing strobes 100d-f. Using different repetitive and periodic series of coded pulses emanating from landing zone 810a relative to landing zone 810b, also allows personnel to visually detect that difference and land aircraft 706 at the appropriate landing zone.

FIG. 8 illustrates two landing zones 810a and 810b and three landing strobes 100a-c and 100d-f for each zone in the example drawing. However, it is understood that a landing zone can have one landing strobe 100, or more than three landing strobes 100. Moreover, there may be one landing zone 810 with a corresponding one or more landing strobes 100, or more than two landing zones 810 having a corresponding single or multiple landing strobes 100. Landing zone designation system 800 is applicable to all such configurations in order to determine or designate an appropriate landing for aircraft 706.

Figure 9:
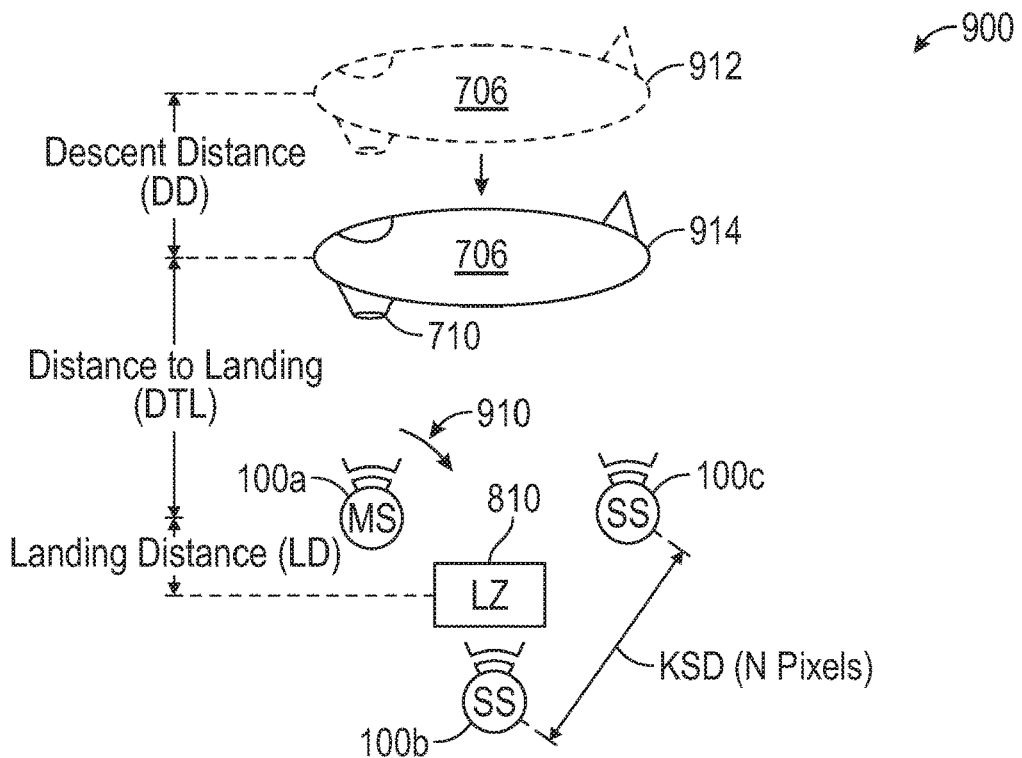
FIG. 9 shows a schematic diagram of a system for determining distance to landing at a descent distance depending on pixel separation between a pair of strobes shown at a landing zone in accordance with various examples.

FIG. 9 shows a schematic diagram of a system 900 for determining distance to landing (DTL) at a decent distance (DD) depending on pixel separation between a pair of strobes 100 near a landing zone 810 in accordance with various examples. System 900 relies on personnel placing at least two strobes 100b and 100c a predetermined or known strobe distance (KSD) apart. Strobes 100b and 100c can be slave strobes (SSs) or, alternatively, the strobes can be a master strobe (MS) spaced a KSD from a slave strobe (SS). In the example shown in FIG. 9, KSD is between two SSs 100b and 100c. A predetermined distance measured on the ground between strobes is stored and thereafter conveyed to the detector 710 (FIGS. 7 and 8) in terms of the number of pixels at a landing distance (LD) to be displayed in a landing distance frame appearing on the detector 710 if the detector 710 were at LD relative to LZ 810. Therefore, N number of pixels would appear within the LD frame of detector 710 if aircraft 706 were at LD relative to LZ 810.

System 900 determines the DTL when aircraft 706 is at DD above LZ 810. During descent at remote LZs, visual reference to the landing terrain can be heavily degraded by the turbulent air during approach and landing. Landing strobes 100 can be arranged in a known geometric pattern, such as a triangle. The landing strobes 100 can be synchronized with each other and, more specifically, SS can be synchronized to an MS. The synchronization can be an optical synchronization where MS shown as reference number 100a can emit a master strobe optical signal 910 to which the SSs 100b and 100c receive and produce corresponding optical signals output therefrom which are synchronized to the MS optical signal 910. Thus, MS 100a not only sends its optical signal to detector 710, but also to SSs 100b and 100c. The radiation pattern can be adjusted to direct the synchronizing optical signal from MS 100a to SSs 100b and 100c. There may be more than two SSs provided there is at least one SS that can synchronize to an MS.

System 900 allows detector 710 to continuously detect a number of pixels within a frame of detector 710 as aircraft 706 descends from distance 912 to distance 914, and further. At distance 914, or DD, a Y number of pixels within a $Y^{TH}$ frame at DD between landing strobes 100b and 100c are registered. The Y number of pixels detected in the $Y^{TH}$ frame at DD within detector 710 can be compared to the stored N number of pixels if aircrafts 706 were on the ground at LZ 810. A DTL can then be computed based on the difference between the Y number of pixels between the optical signals read on the $Y^{TH}$ frame of detector 710 at DD and the stored N number of pixels. A processor coupled to memory can compute that difference, and the memory coupled to detector 710 can store the N number of pixels. The processor processes the difference, and detector 710 provides guidance to, for example, personnel within aircraft 706 in order to land aircraft 706 at LZ 810, and further informs personnel based on pixel distances between landing strobes 100 in video frames to indicate the DTL. Knowing DTL assists the personnel, or pilot, to improve controlled landing in degraded visual conditions.

Figure 10:
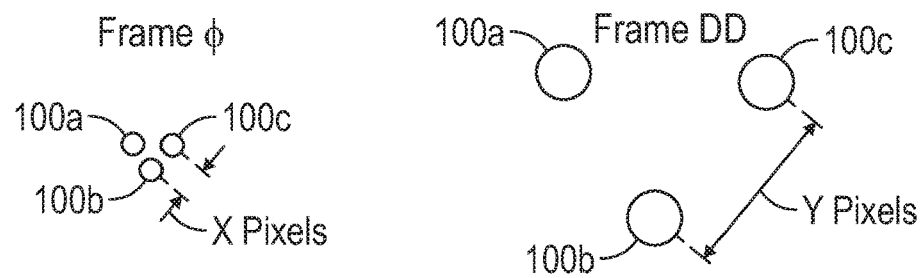
FIG. 10 shows a top view of strobes surrounding a landing zone detected by a camera in different frames as the aircraft is approaching the landing zone for determining pixel separation in accordance with various examples.

FIG. 10 shows a top plan view of landing strobes (e.g., landing strobes 100a-100c). The landing strobes 100 can be placed in a geometric pattern, such as a triangle, around, in, or adjacent to, a landing zone. For example, at distance 912 (FIG. 9), when the first frame of the series of video frames are taken (FRAME 0), the optical signals emitted from landing strobes 100a-100c can appear fairly small with a number of pixels between optical signals shown as X number of pixels within frame 0 being fairly small. However, as aircraft 706 descends to, for example, DD (FIG. 9), the optical signals detected within frame DD when aircraft 706 is at distance 914 (FIG. 9), the optical signal output occupies more pixels for each landing strobe registered on frame DD, and the number of pixels separating the optical signals appearing on the $Y^{TH}$ frame (Y number of pixels) is much greater than the X number of pixels. The processor coupled to detector 710 can compute the DTL by extrapolating Y number of pixels to N number of pixels stored in memory coupled to the processor. Based on the amount of extrapolation needed to eliminate the difference, the DTL when aircraft 706 is at distance 914, or DD, can be computed.

Figure 11:
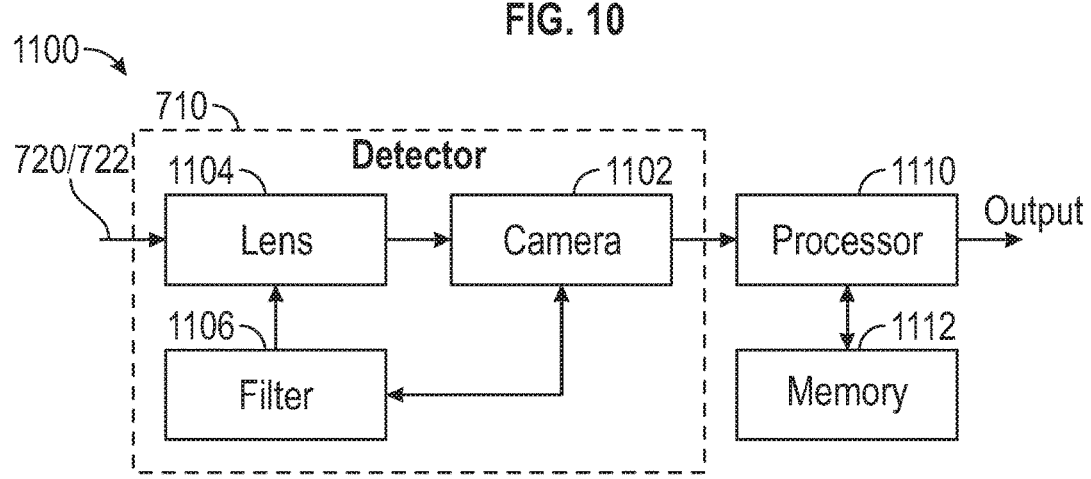
FIG. 11 shows a block diagram of a system for detecting optical signals from one or more landing strobes in one or more landing zones in accordance with various examples.

FIG. 11 shows a block diagram of a system 1100 for detecting optical signals from one or more landing strobes 100 in one or more landing zones 810 in accordance with various examples. System 1100 can be incorporated within an aircraft 706 that includes a detector 710. Detector 710 can be configured for detecting the optical signal 720 and the signature strobe output 722 from one or more landing strobes. Detector 710 includes a camera 1102 having a lens 1104 for receiving the optical signal 720 and the signature strobe output 722. Camera 1102 may be coupled to a filter 1106 that communicates with lens 1104 to operate as an optical filter to select, for example, a frequency/wavelength, or frequency/wavelength range of an optical signal sent from a landing strobe 100. The filter 1106 therefore tunes the camera system lens so that a desired signature strobe output can be detected possibly within one landing zone 810 and not another landing zone, for example. Filter 1106 can also be tuned to allow optical signals from multiple landing zones in one geographic area versus that of another, or to discern friendly landing zones from unfriendly landing zones. Filter 1106 can be tuned to a wavelength or frequency, or any other optical signal output such as, for example, intensity or chromaticity.

Coupled to detector 710 can be a processor 1110. Processor 110 is any form of computing device, such as a microprocessor configured on a semiconductor substrate coupled to any form of storage device, or memory 1112. Processor 1110 of system 1100 is coupled to compute placement of aircraft 706 relative to landing strobes 100, or landing zones 810. Processor 1110 can also be configured to decode a repetitive and periodic series of coded pulses applied to the optical signals output from the landing strobe 100. Memory 1112 can be used to store an expected repetitive and periodic series of coded pulses, and processor 1110 can read the expected series of coded pulses and compare those expected series of coded pulses to coded pulses applied to the landing strobe 100 optical signals. If the coded pulses from landing strobes of one landing zone match the expected coded pulses, then processor 1110 will notify, for example, personnel within aircraft 706 which landing zone produced the matched coded pulse output to determine the proper landing zone in which to land the aircraft 706. The output (OUTPUT) from processor 1110 can be sent to a signaling device, such as a display to signify the appropriate landing strobe 100 or landing zone 810 having the matched coded output. Alternatively, memory 1112 can store an expected frequency or wavelength, and processor 1110 can compare the stored, expected frequency/wavelength to the frequency/wavelength applied to the optical signal or signals from landing strobe 100 or landing zone 810 to send OUTPUT for determining the appropriate landing strobe 100 or landing zone 810 that produced the matched frequency/wavelength.

Figure 12:
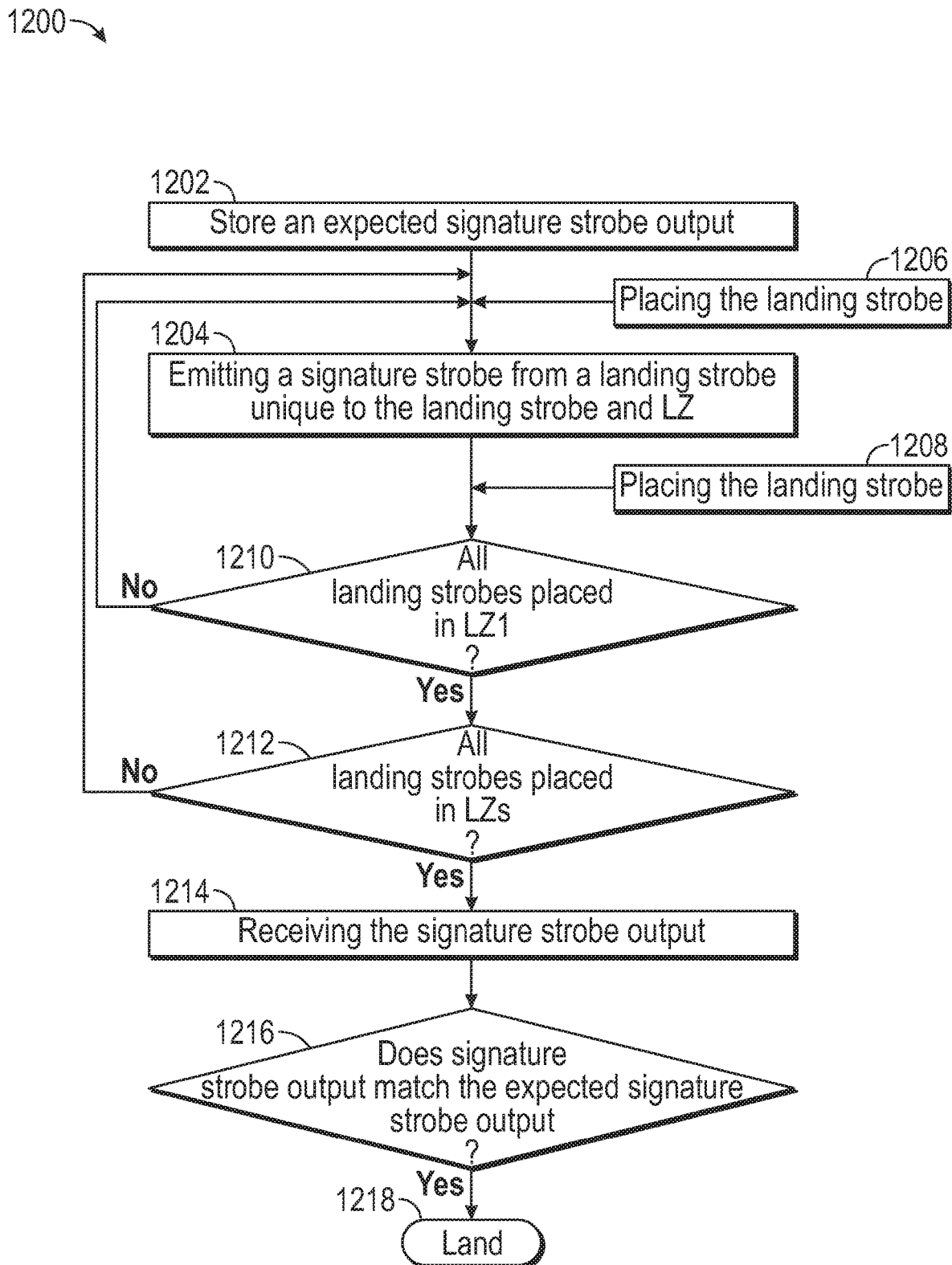
FIG. 12 shows a flow diagram of a method for designating landing of an aircraft in a landing zone in accordance with various examples.

FIG. 12 shows a flow diagram 1200 of a method for designating landing of an aircraft 706 and a landing zone 810. Method 1200 begins by storing an expected signature strobe output 1202 within memory 1112 (FIG. 11) of the aircraft. The signature strobe output is then emitted from a landing strobe unique to the landing strobe or set of landing strobes in a landing zone 1204. The landing strobe can be either placed before the signature strobe is emitted 1206 or after, 1208. A determination is then made whether all landing strobes are placed in the corresponding landing zone 1210, such as the first landing zone or LZ1. If all of the landing strobes are not placed in, for example, the first landing zone, then placement of additional landing strobes occurs. If all landing strobes are placed in corresponding landing zones 1210 and 1212, then the signature strobe output is received 1214 on detector 710 (FIG. 11). A determination is then made on whether the signature strobe output from the landing strobe or strobes matches the expected signature strobe stored in memory 1216. If there is no match, then a signal is not sent to land the aircraft. However, if there is a match, then not only is a signal sent to land the aircraft, but a signal is output to indicate which landing zone the aircraft is to land 1218.

Figure 13:
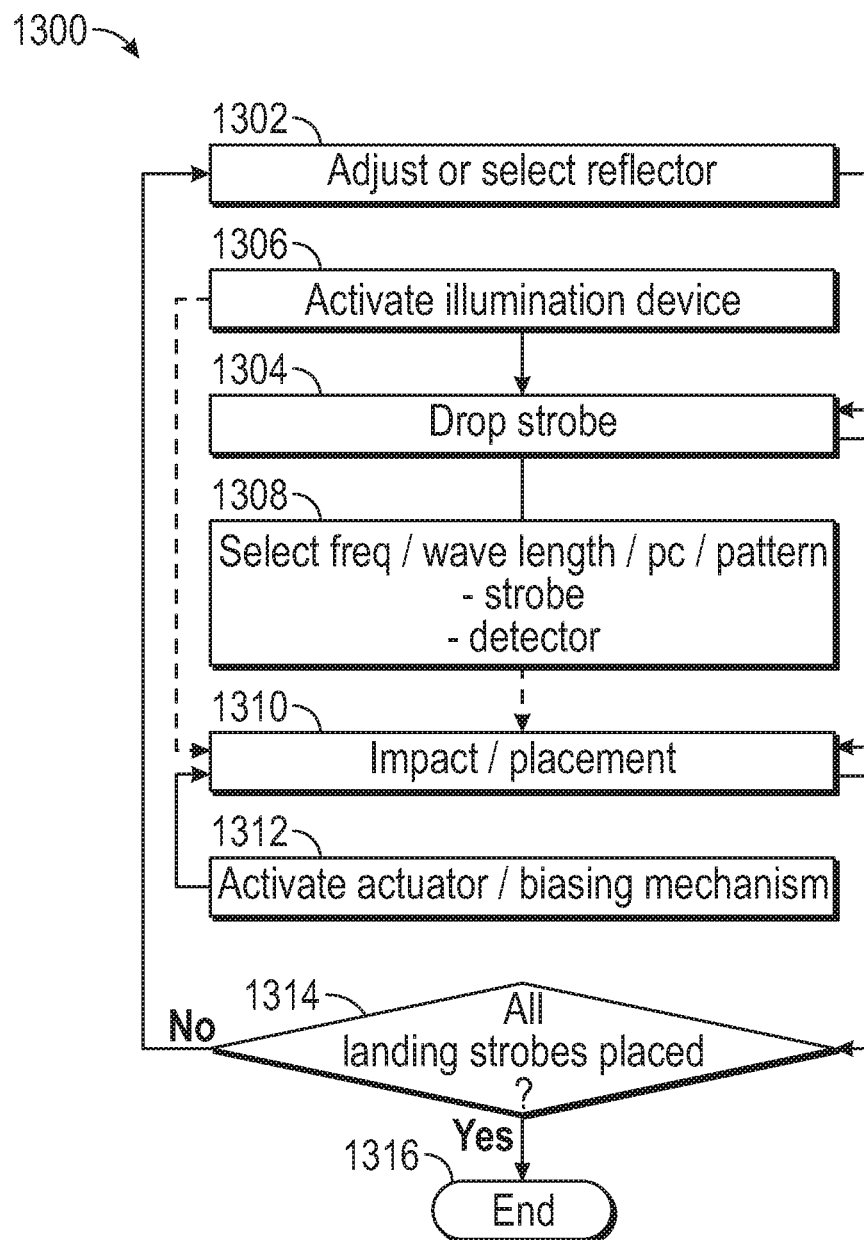
FIG. 13 shows a flow diagram of a method for deploying one or more landing strobes in one or more landing zones in accordance with various examples.

FIG. 13 shows a flow diagram of a method 1300 for deploying one or more landing strobes 100, or one or more landing zones 810 in accordance with various examples. The reflector or other optic elements in the housing of the landing strobe as shown in FIG. 7 can be adjusted or selected during assembly 1302 to modify the radiation output from the optical emitter from the landing strobe. The landing strobe can be dropped from an aircraft 1304, or placed at or near a landing zone. The optical illumination device can be activated either prior to being dropped, after being dropped, or after being placed at or near a landing zone 1306. Moreover, the frequency/wavelength pulse code, or radiation pattern, of the landing strobe or strobes as well as the detector within the overhead aircraft can be set either prior to dropping the strobe or after the strobe is placed, as shown by block 1308.

Upon impact or placement 1310, the actuator and/or biasing mechanism is activated 1312 to maintain the vanes at a downward angle in contact with the upper surface of a landing zone. Once all landing strobes have been placed 1314, then the placement method is terminated 1316. Otherwise, the process flow is repeated.

Figure 14:
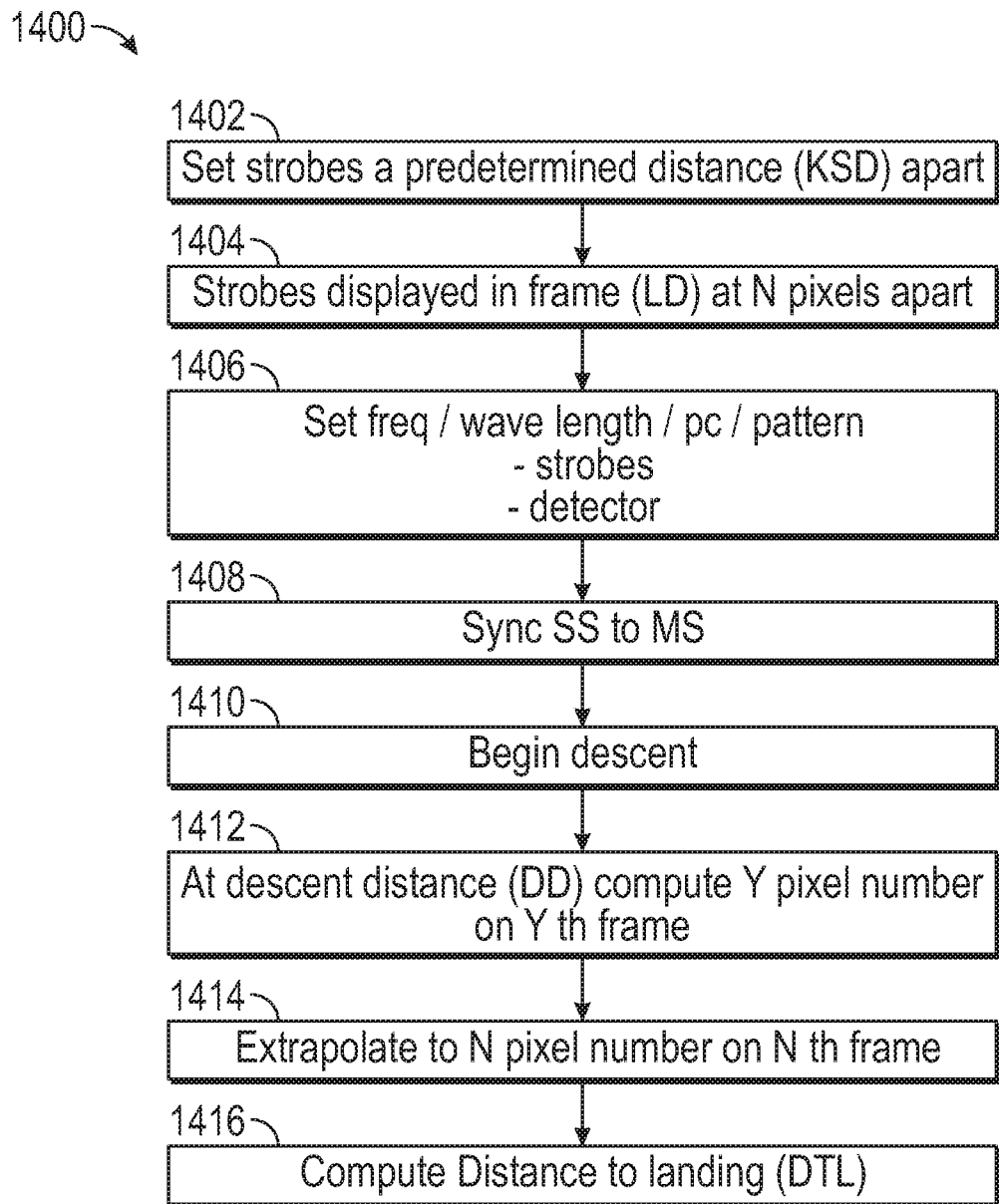
FIG. 14 shows a flow diagram of a method for determining pixel distance between strobes of a camera frame at a descent distance above a landing zone for computing distance to landing at the descent distance in accordance with various examples.

FIG. 14 shows a flow diagram of a method 1400 for determining pixel distance between landing strobes displayed in a camera frame of a detector at a descent distance (DD) above a landing zone for computing distance to landing (DTL) at the descent distance DD in accordance with various examples. The method 1400 begins by setting the landing strobes at a predetermined, or a known strobe distance apart (KSD) at block 1402. If the aircraft were at the landing zone, then the optical output from the landing strobes will be displayed in the LD frame at N pixels apart corresponding to KSD 1404. The frequency/wavelength/pulse code/pattern of the optical output signals from the strobes are set 1406. Moreover, the frequency/wavelength/pulse code/pattern can also be set, or tuned, within the detector to selectively detect the frequency/wavelength/pulse code coming from the landing strobes, as well as to remotely set the radiation pattern emanating from the landing strobes. If the slave strobes are to be synchronized to a master strobe, then the master strobe will emit an optical signal to which the slave strobe can synchronize 1408. The slave strobe will then emit at regular and periodic intervals an optical signal synchronized to the optical signal output from the master strobe.

When determining the DTL, the aircraft upon descent 1404 and at DD, via the processor, will compute Y pixel number on the $Y^{TH}$ frame 1412. The number of pixels from the Y pixel number to the N pixel number on the $N^{TH}$ frame can then be extrapolated 1414 to compute the DTL 1416.

Determination of distance to landing (DTL) can be adaptive. Due to rapid deployment or dropping of the strobes 100 at a distance above the landing zone, the distance between strobes cannot be accurately predetermined. Accordingly, the N number of pixels separating strobes 100 on the ground need not be computed from the predetermined distance on the ground. In these circumstances, software in the camera 1102 of the detector 710 expects the distance between strobes 100 to expand, or increase, in the camera frame as the DTL is reduced. The expansion in successive frames captured by camera 1102 increases as a tangent function approaching 90 degrees as the aircraft gets closer to the landing zone. The camera software can approximate the approach regardless of the rate of descent and DTL using the amount of expansion, even when the strobes are not precisely pre-placed and known to the detection system. Adaptive determination is beneficial when the landing strobes 100 are dropped from the air during scouting prior to landing.

Figure 15:
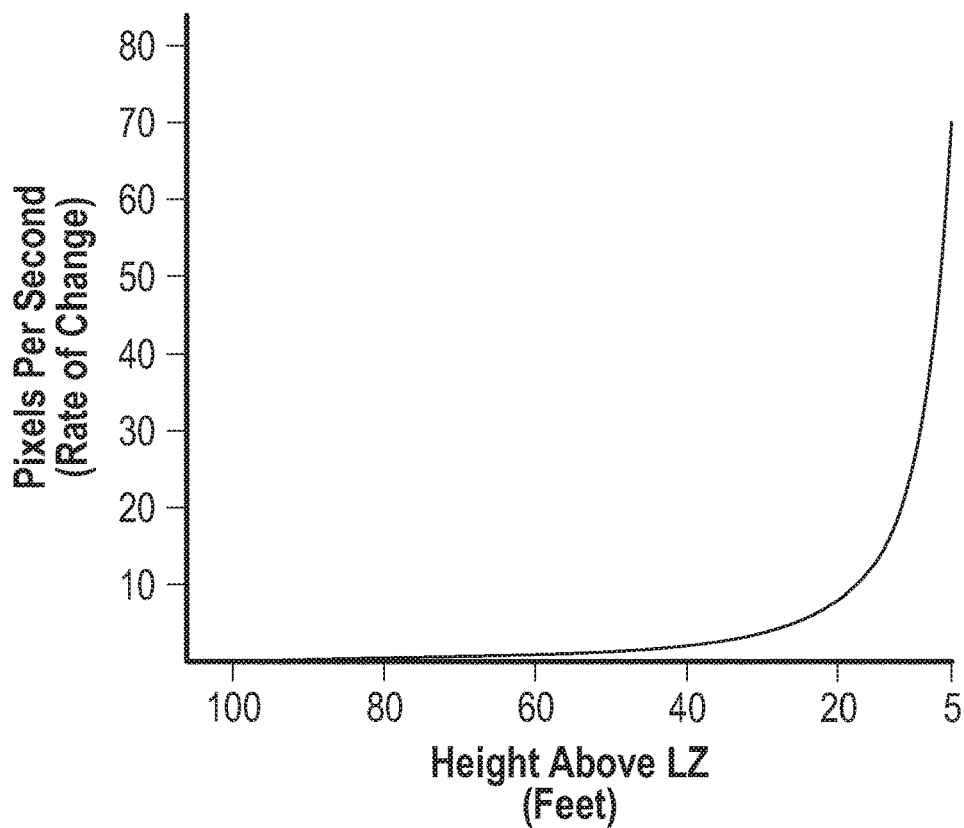
FIG. 15 shows a graph of rate of pixel change relative to height above a landing zone in accordance with various examples.

FIG. 15 is a graph of an amount of pixel change as an aircraft 706 is descending, relative to a height above the landing zone 810. As shown in the graph, when the distance to landing (DTL) is less than 30 feet, for example, the rate of pixel change in number of pixels shown between landing strobes increases as a tangent approaching 90 degrees. When descending at a constant rate of, for example, 1 ft/sec, the slope of the rate of change of the pixel distance between landing strobes is used to calculate DTL at whatever the descent distance (DD) without requiring pre-determined knowledge of a known strobe distance (KSD) separating the landing strobes 100.

Figure 16:
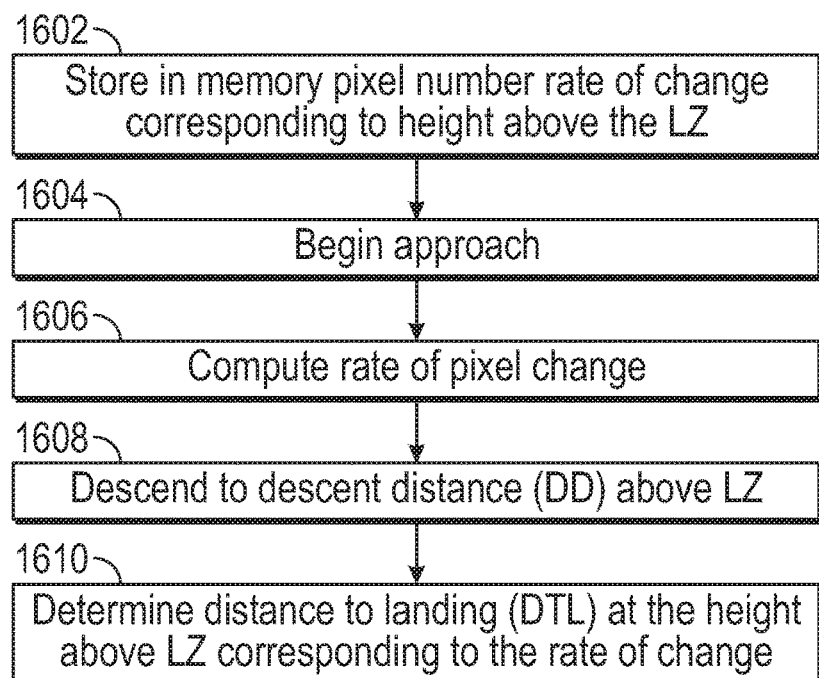
FIG. 16 shows a flow diagram of a method for computing a distance to landing based on a stored rate of pixel change relative to height above the landing zone in accordance with various examples.

FIG. 16 is a flow diagram for calculating DTL using the adaptive determination methodology. The graph of rate of pixel change relative to height above the landing zone 80 is stored in memory 1112 shown in FIG. 11, and shown in FIG. 16 at block 1602. The rate of pixel change expressed as a number of pixels increases per second as the aircraft begins its approach 1604. Throughout the approach and as the aircraft descends, the rate of pixel change will increase as shown in the graph of FIG. 15, and will be computed as shown by block 1606. Knowing the changing rate of pixel change, the aircraft can continue descending to a descent distance (DD) above the landing zone 810 as shown by block 1608. For every change in rate of pixel change, a height above the landing zone 810 can be ascertained by the stored graph of FIG. 15. As noted in block 1610, the DTL can be determined at the height above the landing zone 810 corresponding to the monitored and previously stored rate of pixel change corresponding to the particular height, or DTL.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A landing strobe, comprising:
   a vane extending i) radially outward from a central axis that extends substantially vertical through a center of the landing strobe, and ii) outward from the landing strobe;
   an optical emitter mounted at an upper surface of the landing strobe and configured to emit a radiation pattern that extends upward and radially around the central axis; and
   an actuator coupled to the vane and configured to move the vane from a first position to a second, downward angle position when the landing strobe impacts ground after being released from an aircraft, when an air resistance force is no longer applied to the vane, and when the landing strobe contacts the ground at a landing zone.

2. The landing strobe of claim 1, wherein the vane extends from the landing strobe to a distal end and, when the vane is in the second position, the distal end is below the distal end when the vane is in the first position.

3. The landing strobe of claim 2, wherein the distal end comprises a plurality of spaced protrusions.

4. The landing strobe of claim 1, wherein the actuator comprises a biasing mechanism.

5. The landing strobe of claim 4, wherein the biasing mechanism is configured to maintain the vane in the second position when the landing strobe impacts ground.

6. The landing strobe of claim 1, wherein the radiation pattern is adjustable radially around the central axis.

7. The landing strobe of claim 6, wherein the adjustable radiation pattern is modifiable at dissimilar angles from the central axis.

8. The landing strobe of claim 1, further comprising a weight applied to the landing strobe below a pivot position about which the vane moves.

9. A landing strobe system, comprising:
   a landing strobe configured to be released from an aircraft arranged over a landing zone;
   wherein the landing strobe comprises:
   a) a vane configured to extend i) radially at an upward angle outward from a central axis of the landing strobe when released from the aircraft; and ii) at a downward angle outward from the landing strobe when descent of the landing strobe from the aircraft has ended, when an air resistance force is no longer applied to the vane, and when the landing strobe contacts ground at the landing zone;
   b) an optical emitter mounted at an upper surface of the landing strobe and configured to emit a radiation pattern that extends upward and radially around the central axis.

10. The landing strobe system of claim 9, wherein the upward angle is angled substantially away from the landing zone, and wherein the downward angle is angled substantially toward the landing zone.

11. The landing strobe system of claim 9, wherein the upward angle results from the air resistance force upon the vane.

12. The landing strobe system of claim 11, further comprising a biasing mechanism, and wherein the upward angle results from the air resistance force being greater than a biasing force applied by the biasing mechanism.

13. The landing strobe system of claim 11, wherein the downward angle results from an absence of the air resistance force upon the vane.

14. The landing strobe system of claim 11, further comprising a biasing mechanism, and wherein the downward angle results from the air resistance force being less than a biasing force applied by the biasing mechanism.

15. The landing strobe system of claim 9, further comprising:
   a transducer configured to generate an actuation signal when the landing strobe contacts ground at the landing zone; and
   an actuator coupled to receive the actuation signal and move the vane from the upward angle to the downward angle.

16. The landing strobe system of claim 9, further comprising at least three vanes and corresponding dissimilar upward angles when the landing strobe is released from the aircraft.

17. The landing strobe system of claim 9, further comprising at least three vanes and corresponding dissimilar downward angles when the landing strobe contacts ground at the landing zone.

18. A method for designating a landing zone for an overhead aircraft, comprising:
   releasing a landing strobe from a deploying aircraft;
   during descent of the landing strobe from the deploying aircraft, extending at least three vanes radially outward from the landing strobe in upward angles away from a descent direction;
   after descent has ended, moving the at least three vanes in dissimilar downward angles outward from the landing strobe when an air resistance force is no longer applied to the at least three vanes and the landing strobe impacts ground at the landing zone; and
   radiating an optical signal upward along a central axis that extends through a center of the landing strobe and substantially perpendicular to a surface of the ground at the landing zone, and further radiating the optical signal toward a detector mounted on the overhead aircraft and detectable by the detector.

19. The method as recited in claim 18, wherein the dissimilar downward angles correspond to dissimilar angles along the at least three vanes from the landing strobe when impacting ground at the landing zone having an uneven surface.

20. The method as recited in claim 18, further comprising maintaining the central axis substantially vertical to the surface of the ground at the landing zone after descent has ended.

* * * * *